(12) United States Patent
Cochran et al.

(10) Patent No.: US 7,337,323 B2
(45) Date of Patent: Feb. 26, 2008

(54) BOOT-UP AND HARD DRIVE PROTECTION USING A USB-COMPLIANT TOKEN

(75) Inventors: Michael Lloyd Cochran, Alisa Viejo, CA (US); Laszlo Elteto, Irvine, CA (US); Jenine Ann McQuaid, Rancho Santa Margarita, CA (US); James W. Yip, Walnut, CA (US)

(73) Assignee: SafeNet, Inc., Belcamp, MD (US)

( * ) Notice: Subject to any disclaimer, the term of this patent is extended or adjusted under 35 U.S.C. 154(b) by 810 days.

(21) Appl. No.: 10/664,270

(22) Filed: Sep. 17, 2003

(65) Prior Publication Data

US 2004/0059907 A1   Mar. 25, 2004

Related U.S. Application Data

(60) Provisional application No. 60/412,297, filed on Sep. 20, 2002.

(51) Int. Cl.
*H04L 9/00* (2006.01)
*H04L 9/32* (2006.01)

(52) U.S. Cl. ............ 713/182; 713/185; 713/186; 726/20

(58) Field of Classification Search ........... 713/2, 713/172, 182, 185, 186, 192–194; 726/9, 726/20
See application file for complete search history.

(56) References Cited

U.S. PATENT DOCUMENTS

| 6,334,149 | B1* | 12/2001 | Davis et al. | 709/219 |
| 2001/0023375 | A1* | 9/2001 | Shen | 700/83 |
| 2004/0030908 | A1* | 2/2004 | Lin et al. | 713/193 |

* cited by examiner

*Primary Examiner*—Hosuk Song
(74) *Attorney, Agent, or Firm*—Drinker, Biddle & Reath LLP

(57) ABSTRACT

A method and apparatus for booting a computer. The method comprises the steps of emulating a floppy disk drive communicatively coupled to a computer in a token via a USB-compatible interface, and booting the computer using the token. The apparatus comprises means for performing these functions, including a token with a processor having one or more memories storing processor instructions and data for performing the method steps. The memory may also securely store sensitive data.

39 Claims, 5 Drawing Sheets

BOOT-UP AND HARD DRIVE PROTECTION USING A USB-COMPLIANT TOKEN

CROSS-REFERENCE TO RELATED APPLICATIONS

This application claims benefit of U.S. Provisional Patent Application No. 60/412,297, entitled "BOOT-UP AND HARD DRIVE PROTECTION USING A USB-COMPLIANT TOKEN," by Michael L. Cochran, Laszlo Elteto, Jenine A. McQuaid, and James W. Yip, filed Sep. 20, 2002, which application is hereby incorporated by reference herein.

This application is related to the following co-pending and commonly assigned patent application(s), all of which applications are incorporated by reference herein:

Application Ser. No. 09/281,017, entitled "USB-COMPLIANT PERSONAL KEY", by Shawn D. Abbott, Bahram Afghani, Allan D. Anderson, Patrick N. Godding, Maarten G. Punt, and Mehdi Sotoodeh, filed Mar. 30, 1999, which claims benefit of application Ser. No. 06/116,106, entitled "USB-COMPLIANT PERSONAL KEY", by Shawn D. Abbott, Bahrain Afghani, Allan D. Anderson, Patrick N. Godding, Maarten G. Punt, and Mehdi Sotoodeh, filed Jan. 15, 1999; and Application Ser. No. 09/449,159, entitled "USB-COMPLIANT PERSONAL KEY WITH INTEGRAL INPUT AND OUTPUT DEVICES", by Shawn D. Abbott, Bahram Afghani, Mehdi Sotoodeh, Norman L. Denton III and Calvin W. Long, filed Nov. 24, 1999.

BACKGROUND OF THE INVENTION

1. Field of the Invention

The present invention relates to systems and methods for protecting computers and software applications from unauthorized use or disclosure, and in particular to a system and method for protecting a computer and related subsystems from tampering during boot-up.

2. Description of the Related Art

Desktop computers typically store operating system information in an attached hard disk drive. Since the operating system software is stored on a hard drive, and the hard drive cannot be read until the operating system is operational, personal computer (PC) include an essential set of routines, known as a Basic Input Output System (BIOS), which is typically stored on a chip, to provide a temporary interface between the operating system and the computer hardware. The BIOS supports all peripheral technologies and internal services such as the realtime clock (time and date). On startup, the BIOS tests the system and prepares the computer for operation by querying its own small CMOS memory bank (typically kept active using a small battery) for drive and other configuration settings. It searches for other BIOS's on the plug-in boards and sets up pointers (interrupt vectors) in memory to access those routines. It then loads the operating system and passes control to it. The BIOS accepts requests from the drivers as well as the application programs.

Because most protection schemes are implemented in the operating system or other applications that are not active until the bootup sequence is completed, computers can be especially vulnerable to hacking during the bootup sequence.

Most BIOS include password protection to protect the computer from unauthorized access and compromise of its security features. However, this password protection has several drawbacks. First, it can be reset by removing the battery providing power to the CMOS chip implementing the BIOS software. Second, it does not protect potentially sensitive data stored on the hard drive itself.

The ATA3 (AT Attachment, version 3) specification allows hard drives to be password protected, but few BIOS use this feature. Chip manufacturers such as INTEL have implemented protection access architectures (PAAs) to protect computers at the BIOS level, but it requires not only the BIOS but the computer to have some form of protected storage. Further, PAAs use tokens, biometric input or entered passwords simply as a trap to determine if the boot process should continue (typically by checking for the presence of a "secret"). If the correct input is provided, the BIOS simply proceeds to the next instruction. This occurs before the BIOS attempts to start the operating system. Another difficulty with this technique is that it requires changes to the BIOS code. Existing computers would require the BIOS to be updated or replaced.

There are software-based pre-boot authentication products, which use either biometrics or software to replace the boot sequence, via the master boot record (MBR) on the hard drive, but without full drive encryption, the data on the hard drive remains unprotected.

Computers may be booted from a floppy drive, but many computers, including many laptops, are no longer supplied with internal floppy disk drives. Further, floppy disks can be compromised if lost (the ATA-3 password must still be protected). Finally, floppy disks are prone to failure and wear and consumers regard booting from floppy disk drives as an inconvenience.

What is needed is a system for protecting sensitive information on the computer during boot up operations. The present invention satisfies that need.

SUMMARY OF THE INVENTION

To address the requirements described above, the present invention discloses a method and apparatus for booting a computer. The method comprises the steps of emulating a floppy disk drive communicatively coupled to a computer in a token via a USB-compatible interface, and booting the computer using the token. The apparatus comprises means for performing these functions, including a token with a processor having one or more memories storing processor instructions and data for performing the method steps. The memory may also securely store sensitive data.

The invention does not rely on the BIOS, and can therefore serve users with legacy computers having standard BIOS. Further, the present invention operates with passwords that lock the hard drive to prevent unauthorized disclosure.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
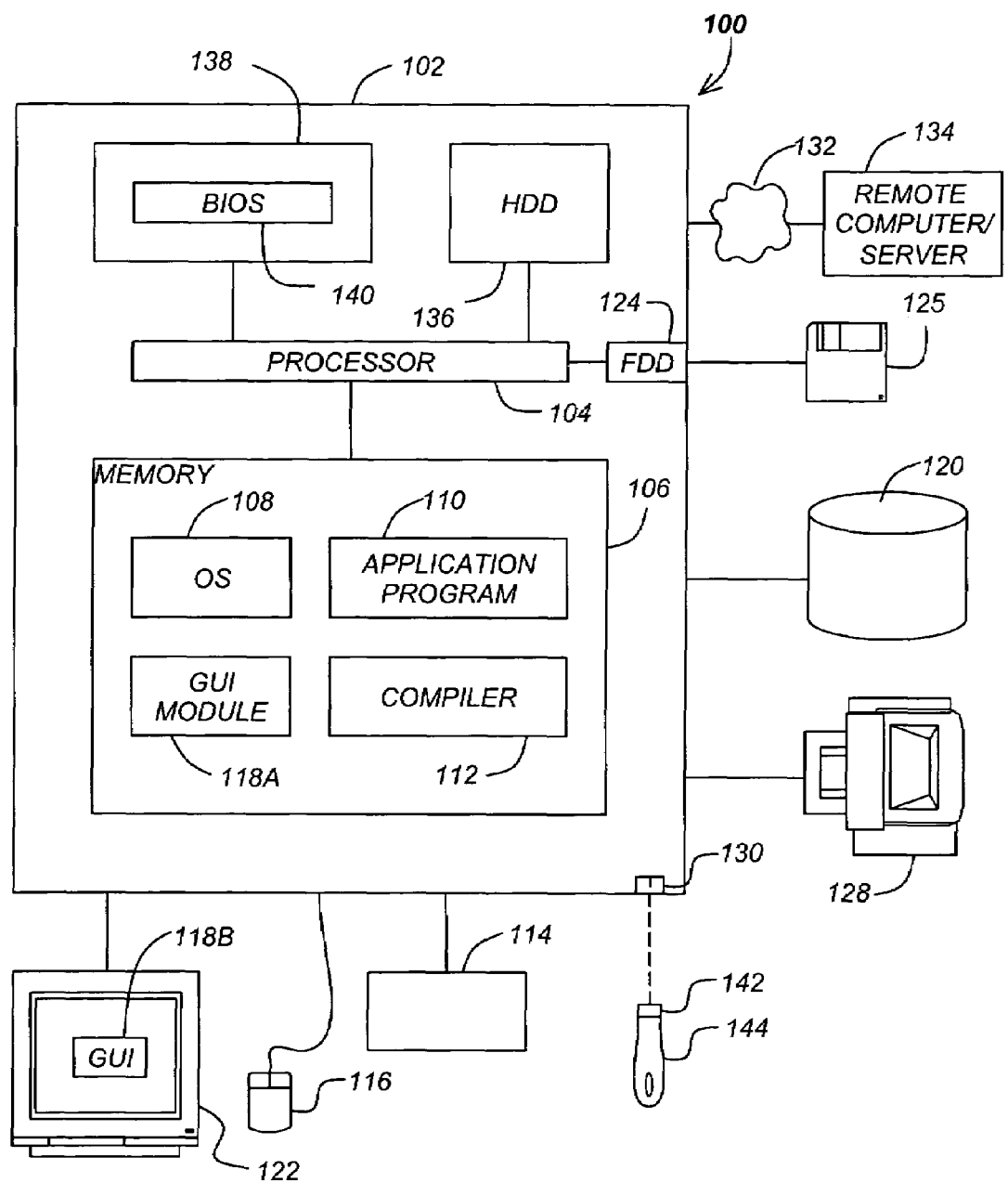
FIG. 1 is a block diagram showing an exemplary hardware environment for practicing the present invention.

FIG. 1 illustrates an exemplary computer system 100 that could be used to implement the present invention. The computer 102 comprises a processor 104 and a memory, such as random access memory (RAM) 106. The computer 102 is operatively coupled to a display 122, which presents images such as windows to the user on a graphical user interface 1181B. The computer 102 may be coupled to other devices, such as a keyboard 114, a mouse device 116, a printer 128, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that are generated using the compiler 112. The computer 102 also comprises an input/output (I/O) port 130 for a personal token 144 (hereinafter alternatively referred to also as a personal key 144). In one embodiment, the I/O port 130 is a USB-compliant port implementing a USB-compliant interface.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive 136, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices, thereby making a computer program product or article of manufacture according to the invention. As such, the terms "article of manufacture" and "computer program product" as used herein are intended to encompass a computer program accessible from any computer readable device or media.

The computer 102 may be communicatively coupled to a remote computer or server 134 via communication medium 132 such as a dial-up network, a wide area network (WAN), local area network (LAN), virtual private network (VPN) or the Internet. Program instructions for computer operation, including additional or alternative application programs can be loaded from the remote computer/server 134. In one embodiment, the computer 102 implements an Internet browser, allowing the user to access the World Wide Web (WWW) and other Internet resources.

Upon boot up, the processor 104 responds to BIOS 140 computer instructions stored in ROM 138 to interface with the computer's hard disk drive 136. The master boot record (MBR) is read from the hard disk drive 136, and used to read the operating system 108 instructions from the hard drive 136 and store them in the memory 106. A boot program may also be stored in a floppy 124 or, as described below, a token 144 communicatively coupled to the computer 102 via a Universal Serial Bus (USB) compliant interface 130 and 142.

Those skilled in the art will recognize that many modifications may be made to this configuration without departing from the scope of the present invention. For example, those skilled in the art will recognize that any combination of the above components, or any number of different components, peripherals, and other devices, may be used with the present invention.

Architectural Overview

Figure 2:
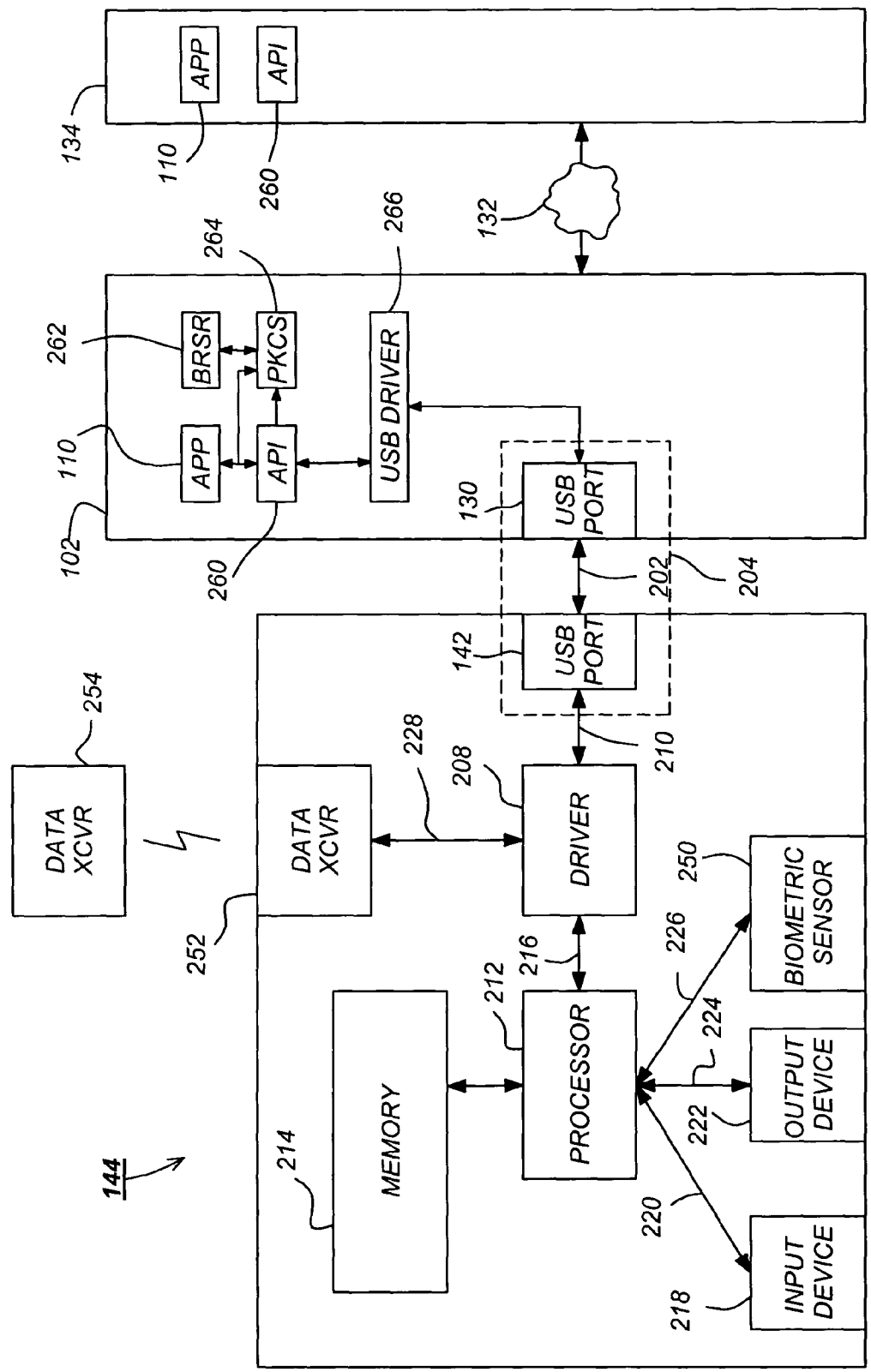
FIG. 2 is a diagram depicting an architectural overview of the present invention.

FIG. 2 is a block diagram illustrating selected modules of the present invention. The personal key 144 communicates with and obtains power from the host computer through a USB-compliant communication path 202 in the USB-compliant interface 204 which includes the input/output port 130 of the host computer 102 and a matching input/output (I/O) port 142 on the personal key 144. Signals received at the personal key I/O port 142 are passed to and from the processor 212 by a driver/buffer 208 via. communication paths 210 and 216. The processor 212 is communicatively coupled to a memory 214, which may store data and instructions/commands to implement the features of the invention as described herein. In one embodiment, the memory 214 is a non-volatile random-access memory that can retain factory-supplied data as well as customer-supplied application related data. The processor 212 may also include some internal memory for performing some of these functions.

The processor 212 is optionally communicatively coupled to an input device 218 via an input device communication path 220 and to an output device 222 via an output device communication path 224, both of which are distinct from the USB-compliant interface 204 and communication path 202. These separate communication paths 220 and 224 allow the user to view information about processor 212 operations and provide input related to processor 212 operations without allowing a process or other entity with visibility to the USB-compliant interface 204 to eavesdrop or intercede. This permits secure communications between the key processor 212 and the user. In one embodiment of the invention set forth more fully below, the user communicates directly with the processor 212 by physical manipulation of mechanical switches or devices actuatable from the external side of the key (for example, by pressure-sensitive devices such as buttons and mechanical switches). In another embodiment of the invention set forth more fully below, the input device includes a wheel with tactile detents indicating the selection of characters.

The input device and output devices 218, 222 may cooperatively interact with one another to enhance the functionality of the personal key 144. For example, the output device 222 may provide information prompting the user to enter information into the input device 218. For example, the output device 222 may comprise a visual display such as an alphanumeric LED or LCD display (which can display Arabic numbers and or letters) and/or an aural device. The user may be prompted to enter information by a beeping of the aural device, by a flashing pattern of the LED, or by both. The output device 222 may also optionally be used to confirm entry of information by the input device 218. For example, an aural output device may beep when the user enters information into the input device 218 or when the user input is invalid. The input device 218 may take one of many forms, including different combinations of input devices.

Although the input device communication path 220 and the output device communication path 224 are illustrated in FIG. 2 as separate paths, the present invention can be implemented by combining the paths 220 and 224 while still retaining a communication path distinct from the USB-compliant interface 204. For example, the input device 218 and output device 222 may be packaged in a single device and communications with the processor 212 multiplexed over a single communication path.

In one embodiment of the invention, the present invention further comprises a second output device 222 that may be coupled to the USB-compliant interface 204 instead of being coupled to the processor via a communication path distinct from the USB-compliant interface 204. This embodiment may be used, for example, to indicate to the user that the personal key 144 has been correctly inserted into the host computer's USB port (for example, by providing an indication of a power signal of the USB-compliant interface). The second output device may also be used to show that data is passing to and from the host computer and the personal key 144 (for example, by providing an indication of a data signal from the USB-compliant interface).

The personal key has an interface including a USB driver module 266 communicatively coupled to an application program interface (API) 260 having a plurality of API library routines. The API 260 provides an interface with the application 110 to issue commands and accept results from the personal key 144. In one embodiment, a browser 262, such as the browser available from NETSCAPE, Inc. operates with the API 260 and the public key cryptographic standard (PKCS) module 264 to implement a token-based user authentication system.

While the portability and utility of the personal key has many advantages, it also has one important disadvantage . . . it can be lost or stolen. This is especially troublesome because the personal key 144 represents a secure repository for so much of the user's private data. For these reasons, the ultimate security of the information contained in the personal key 144 (but not necessarily the personal key 144 itself) is highly important.

Ultimately, the personal key 144 identifies the possessor to the outside world through the host computer 102, but there is no guarantee that the person in possession of the personal key 144 is the actual owner, because the personal key may have been lost or stolen. Security can be increased with the use of personal passwords and the like, but this solution is not ideal. First, the use of a single password raises the very real possibility that the password may have been compromised (after all, the thief may know the user, and hence, the user's password). Also, requiring the entry of a password multiple times increases the chance that malicious software executing in the host computer 102 or the remote computer 134 may eavesdrop on the password or personal identification. The use of multiple passwords is no solution because one of the reasons for using the personal key 144 is to relieve the user of the need to remember a number of passwords. Another problem with passwords is that hacking methods can be employed to circumvent the password protection or to discover the password itself. This is especially problematic in context of a personal key 144 which in most cases, depends on data entered in a host computer 102 peripheral such as the keyboard 114 and transmitted via the input/output port 130, rendering the personal key 144 vulnerable to hacking.

In one embodiment of the present invention, a biometric sensing device 250 is mounted on or in the personal key 144 to collect biometric data from the user when the user is holding the personal key 144. In one embodiment, the biometric sensing device 250 comprises a fingerprint sensor, which is capable of reading the user's fingerprints. The biometric sensor 250 may also include built-in processing to reduce the biometric data to data suitable for use by the processor 212. If necessary for the collection of biometric data, a light emitting or heat-emitting device can be placed proximate to the biometric sensor to provide an active data measurement using light or heat.

The biometric sensor 250 is nominally placed where it can best measure the biometric data of interest. In the illustrated embodiment, the biometric sensor 250 is sized and disposed to collect data from the user's thumbprint when the user grips the personal key 144 to insert it into the host computer 102 I/O port 130. To facilitate measurement of the holder's fingerprint, the exterior surface of the personal key 144 can be designed to cradle the user's thumb in a particular place. Alternatively, to increase security, the exterior appearance of the personal key 144 may be designed to mask the presence of the biometric sensor 250 entirely.

The biometric sensor 250 can be advantageously placed in a position where it can be expected to collect known data of a predictable type, at a known time (for example, obtaining a thumbprint when the personal key 144 is plugged into the host computer I/O port 130). The personal key 144 accepts data from the biometric sensor 250 via biometric sensor communication path 226 to verify the identity of the person holding the key with no passwords to remember or compromise, or any other input. Thus, the biometric sensor 250 provides a personal key 144 with a heightened level of security which is greater than that which can be obtained with a password alone. If necessary, the personal key 144 can be configured to recognize the host computer 102 it is plugged into, and using data thus obtained, further increase the security of the key.

The biometric sensor 250 can also be used to increase the security of the personal key in other ways as well. For example, if the personal key 144 were to be stolen, the biometric sensor can be used to measure the fingerprint of the thief. This data can be stored and retained until such time as the thief attempts to use the personal key to make a purchase, for example on the Internet. At this time, the personal key 144 can be programmed to contact (with or without visibility to the thief) a particular entity (such as an Internet site), where the fingerprint information (and any other relevant information) can be transferred to the appropriate authority. The personal key 144 may also perform this dial up and report function if a number of incorrect passwords have been supplied.

In one embodiment of the present invention, the personal key 144 also comprises a data transceiver 252 for communicating data with an external data transceiver 254. The data transceiver 252 is communicatively coupled to the processor 212, via the driver 208 and communication paths 216 and 228, and allows the personal key 144 to transmit and receive data via the transmission and reception of electromagnetic waves without exposing the data to the USB-compliant interface 204. Alternatively, the data transceiver 252 may be communicatively coupled directly to the processor 212.

In one embodiment, the data transceiver 252 comprises an infrared (IR) transceiver that can communicate with a number of commercially available peripherals with similar capability. This feature provides the personal key 144 another means for communicating with external peripherals and devices, even when the personal key 144 is already coupled to the I/O port 130 of the host computer 102.

In one embodiment, the personal key 144 also comprises a power source such as a battery or capacitive device. The power source supplies power to the components of the personal key to allow the data to be retained and to allow personal key functions and operations to be performed, even when disconnected from the host computer 102.

Figure 3A:
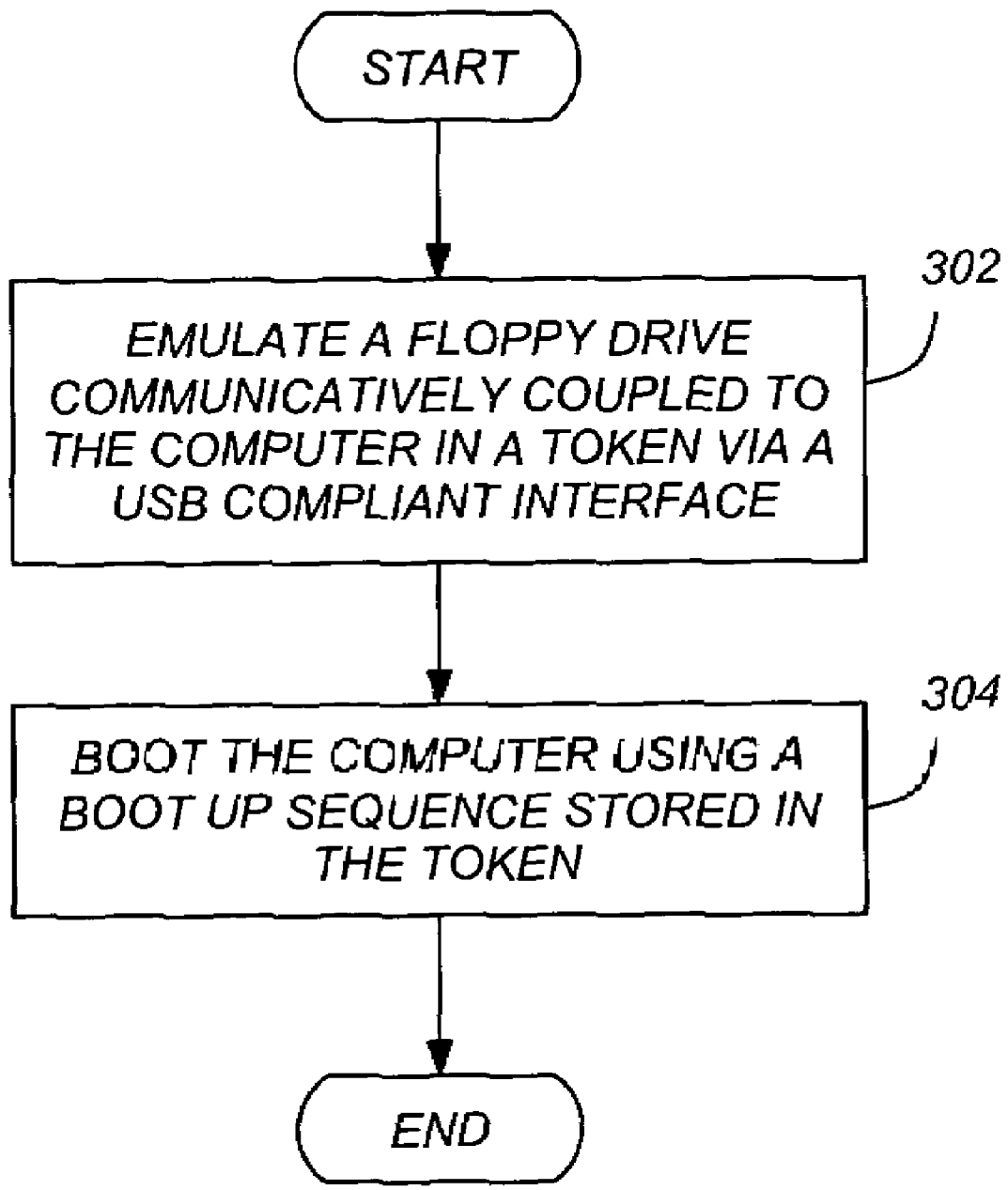
FIGS. 3A-3C are flow charts presenting exemplary method steps that can be used to practice the invention.
Figure 3B:
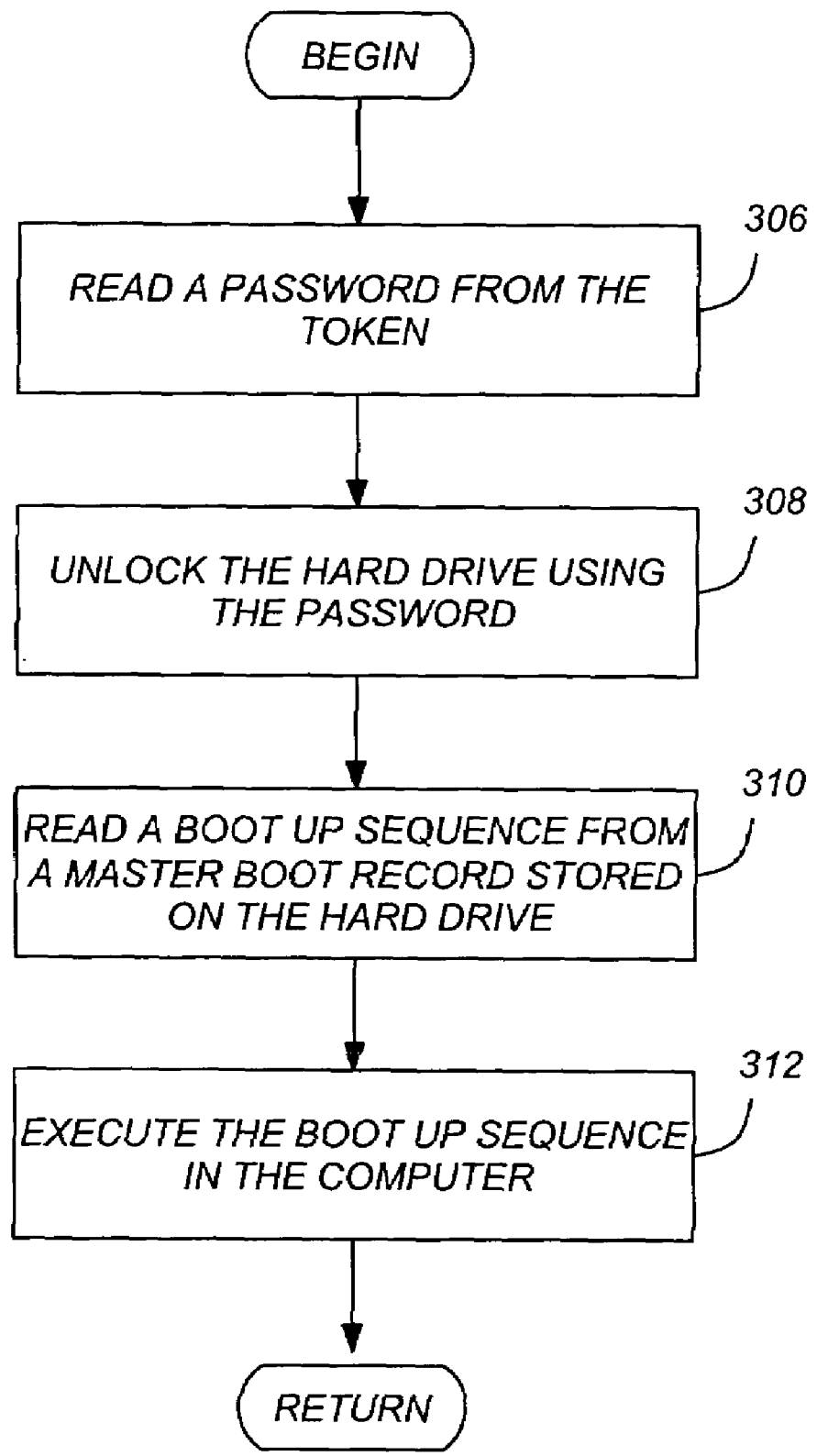
Figure 3C:
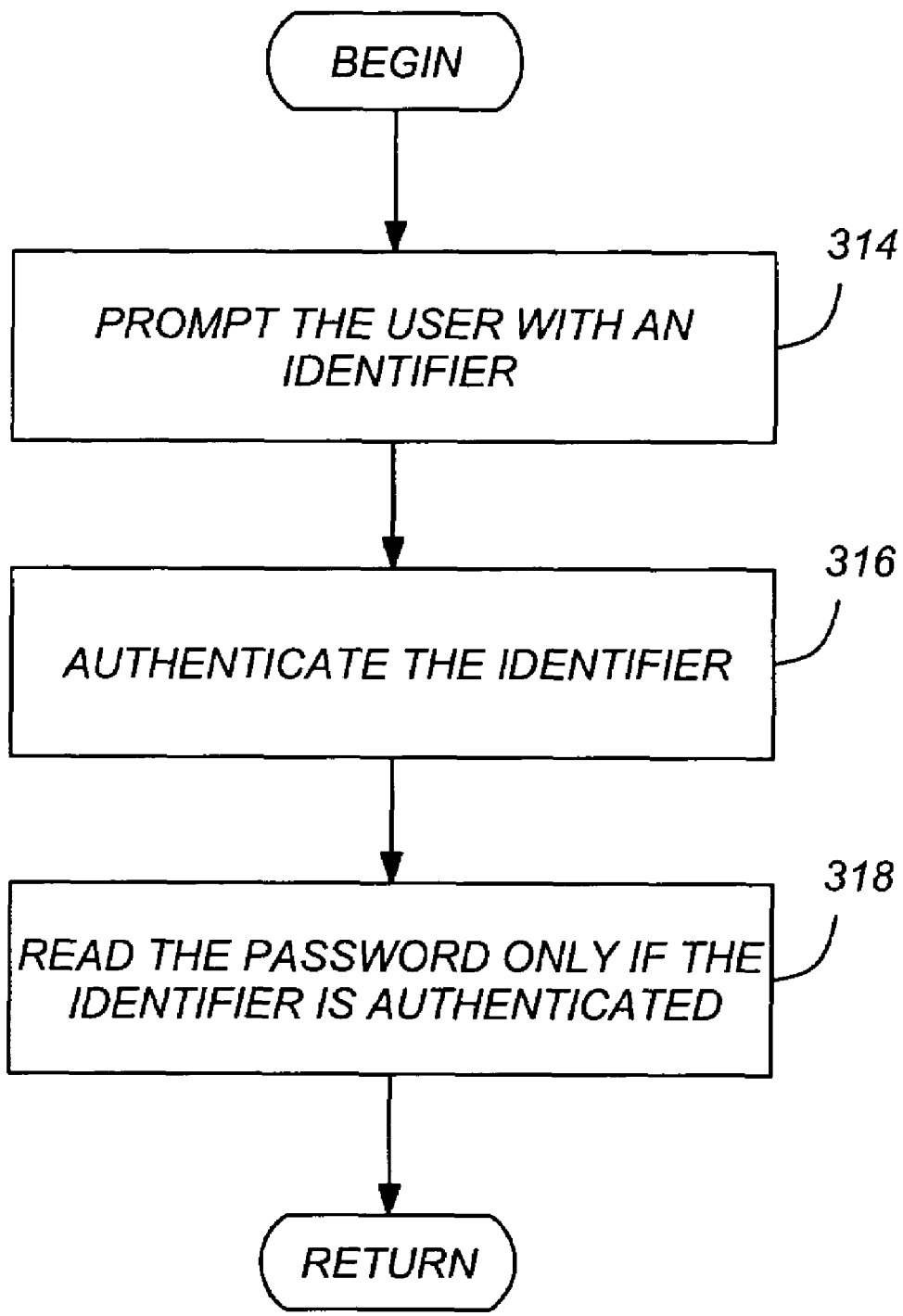

FIGS. 3A-3C are flow charts illustrating exemplary method steps that can be used to practice the present invention. A token 144 is communicatively coupled to the computer 102 via a USB-compliant interface 130, 142. The token 144 includes a processor 212 and a memory 214 storing instructions/commands that emulate a floppy disk drive 124. This is shown in block 302. The computer 102 is booted up using the token 144, as shown in block 304. In one embodiment, the boot up sequence is stored in a memory 214 of the token 144, and the token 144 essentially emulates a boot up floppy drive 124 and boot up floppy 125. In another embodiment, an additional boot up sequence is stored on the hard disk drive 136.

FIG. 3B is a diagram showing exemplary operations for booting up the computer 102 using the token 144. A boot code in the token 144 is used to read a password from the memory 214 of the token 144, as shown in block 306. In one embodiment, the password is an ATA-3 password that is required in order to access the hard drive. The password can be stored as an ordinary file within the OS-emulated file structure, or can be stored in a secure memory of the token 144.

The boot code uses the password to unlock the hard drive 136, as shown in block 308. Thereafter, the master boot record in the hard drive 136 can be read to obtain the boot up sequence. This is shown in block 310. The boot up sequence can then be executed directly. This effectively continues the boot sequence as if the boot were being performed from the hard drive 136.

FIG. 3C is a diagram showing exemplary operations for reading the password from the token 144. In this embodiment, the password can only be read from the token 144 if the user is authenticated. Authentication can be accomplished by configuring the boot code in the token 144 to accept a personal identification number (PIN) or other identifier (optionally, in response to a user-prompt), authenticate the PIN provided by the user, and only allow the password to be used or accessed if the PIN has been authenticated. This is shown in blocks 314-318. The foregoing does not rely on new BIOS, and hence serves a user base with currently existing equipment.

The token 144 can be a dual-mode token, allowing it emulate a floppy disk drive 124 and floppy 125 attached to the USB interface 130, 142, as well as an ordinary authentication token. The boot code stored in the token 144 can automatically switch the token 144 from the floppy emulation mode after the computer is booted (thus ceasing or disabling the floppy emulation) to the token mode, thus allowing the same token 144 to be used to authenticate the user to the computer operating system 108 (e.g. by data stored in or entered into the computer 102 after the boot is completed. The dual-mode token can also be configured to disable the floppy emulation and always operate like an ordinary token 144 when powered up.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed:

1. A method of booting a computer, comprising the steps of:
   emulating a floppy drive containing a floppy disk and communicatively coupled to the computer in a token via a USB-compliant interface; and
   booting the computer using the token by:
   (a) reading a password from the token;
   (b) unlocking a hard drive using the password;
   (c) reading the boot-up sequence from a master boot record stored on the hard drive; and
   (d) executing said boot-up sequence.

2. The method of claim 1, wherein the password is an ATA-3 password.

3. The method of claim 1, wherein the password is stored as a file in the emulated floppy drive.

4. The method of claim 1, wherein the password is stored in a secure memory of the token.

5. The method of claim 1, wherein the step of reading the password from the token comprises the steps of:
   prompting the user for a identifier;
   authenticating a user-provided identifier; and
   reading the password only if the user-provided identifier is authenticated.

6. The method of claim 5, wherein the user-provided identifier comprises a user password.

7. The method of claim 5, wherein the user-provided identifier comprises a biometric data.

8. The method of claim 7, wherein the biometric data comprises a fingerprint.

9. The method of claim 1, wherein the computer is controlled by an operating system after the computer is booted and the method further comprises the steps of:
   automatically ceasing emulating the floppy drive after the computer is booted; and
   authenticating the user using the token and the operating system and data stored or entered into the computer after the computer is booted.

10. The method of claim 1, further comprising the step of disabling the emulation of the floppy drive.

11. The method of claim 1, wherein the step of booting the computer using a boot up sequence comprises the steps of:
   reading a boot up sequence from the token; and
   performing the boot up sequence.

12. The method of claim 11, further comprising the steps of:
automatically ceasing emulating the floppy drive after the computer is booted.

13. The method of claim 12, further comprising the steps of:
authenticating the user using the token and the operating system and data stored or entered into the computer after the computer is booted.

14. An apparatus for booting a computer, comprising:
means for emulating a floppy drive containing a floppy disk and communicatively coupled to the computer in a token via a USB-compliant interface;
means for booting the computer using the token, said means for booting comprising;
(a) means for reading a password from the token;
(b) means for unlocking a hard drive using the password;
(c) means for reading a boot-up sequence from a master boot record stored on the hard drive; and
(d) means for executing said boot-up sequence.

15. The apparatus of claim 14, wherein the password is an ATA-3 password.

16. The apparatus of claim 14, wherein the password is stored as a file in the emulated floppy drive.

17. The apparatus of claim 14, wherein the password is stored in a secure memory of the token.

18. The apparatus of claim 14, wherein the means for reading the password from the token comprises:
means for prompting the user for a identifier;
means for authenticating a user-provided identifier; and
means for reading the password only if the user-provided identifier is authenticated.

19. The apparatus of claim 18, wherein the user-provided identifier comprises a user password.

20. The apparatus of claim 18, wherein the user-provided identifier comprises a biometric data.

21. The apparatus of claim 20, wherein the biometric data comprises a fingerprint.

22. The apparatus of claim 14, wherein the computer is controlled by an operating system after the computer is booted and the apparatus further comprises:
means for automatically ceasing emulating the floppy drive after the computer is booted; and
means for authenticating the user using the token and the operating system and data stored or entered into the computer after the computer is booted.

23. The apparatus of claim 14, further comprising means for disabling the emulation of the floppy drive.

24. The apparatus of claim 14, wherein the means for booting the computer using a boot up sequence comprises:
means for reading a boot up sequence from the token; and
means for performing the boot up sequence.

25. The apparatus of claim 24, further comprising: means for automatically ceasing emulating the floppy drive after the computer is booted.

26. The apparatus of claim 25, further comprising: means for authenticating the user using the token and the operating system and data stored or entered into the computer after the computer is booted.

27. A token, comprising:
an input/output (I/O) interface communicatively coupleable to a computer;
a processor, communicatively coupled to the I/O interface; and
a memory, communicatively coupled to the processor, the memory for storing a plurality of processor instructions to emulate a floppy drive containing a floppy disk and communicatively coupled to the computer, and for booting the computer using the token, the processor generating commands for booting the computer using a boot up sequence, the commands comprising:
at least one processor command for reading a password from the token;
at least one processor command for unlocking a hard drive using the password;
at least one processor command for reading a boot-up sequence from a master boot record stored on the hard drive; and
at least one processor command for executing said boot-up sequence.

28. The apparatus of claim 27, wherein the password is an ATA-3 password.

29. The apparatus of claim 27, wherein the password is stored as a file in the emulated floppy drive.

30. The apparatus of claim 27, wherein the password is stored in a secure memory of the token.

31. The apparatus of claim 27, wherein the at least one processor command for reading the password from the token comprises:
at least one processor command for prompting the user for a identifier;
at least one processor command for authenticating a user-provided identifier; and
at least one processor command for reading the password only if the user-provided identifier is authenticated.

32. The apparatus of claim 31, wherein the user-provided identifier comprises a user password.

33. The apparatus of claim 31, wherein the user-provided identifier comprises a biometric data.

34. The apparatus of claim 33, wherein the biometric data comprises a fingerprint.

35. The apparatus of claim 27, wherein the computer is controlled by an operating system after the computer is booted and wherein the plurality of processor commands comprises:
at least one processor command for automatically ceasing emulating the floppy drive after the computer is booted; and
at least one processor command for authenticating the user using the token and the operating system and data stored or entered into the computer after the computer is booted.

36. The apparatus of claim 27, further comprising means for disabling the emulation of the floppy drive.

37. The apparatus of claim 27, wherein the processor commands for booting the computer using a boot up sequence comprises:
at least one processor command for reading a boot up sequence from the token; and
at least one processor command for performing the boot up sequence.

38. The apparatus of claim 37, wherein the emulation of the floppy drive is automatically ceased after the computer is booted.

39. The apparatus of claim 38, further comprising:
at least one processor command for authenticating the user using the token and the operating system and data stored or entered into the computer after the computer is booted using the token.

* * * * *